Sept. 10, 1957 F. C. MIKLAS 2,806,107
ADJUSTABLE THERMOSTAT FOR COOKING APPLIANCE OR THE LIKE
Filed Dec. 1, 1955
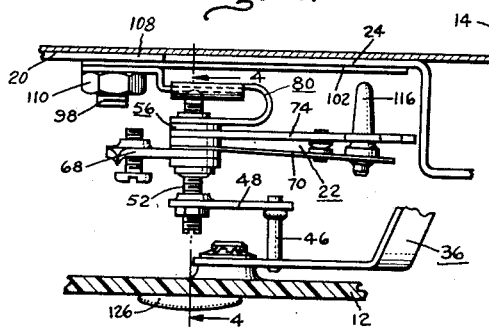
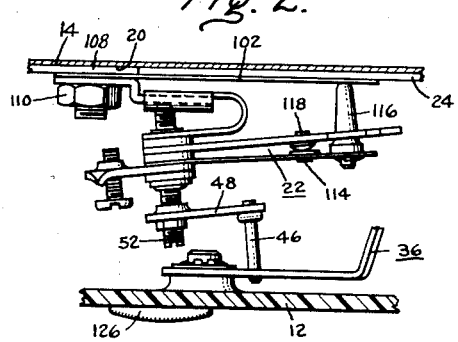
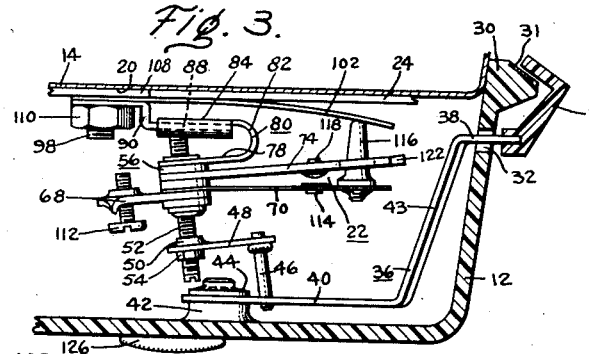
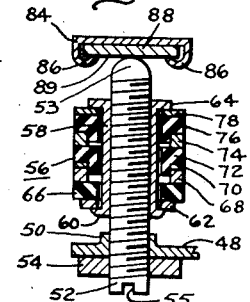
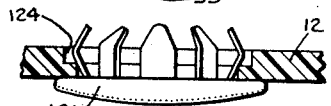
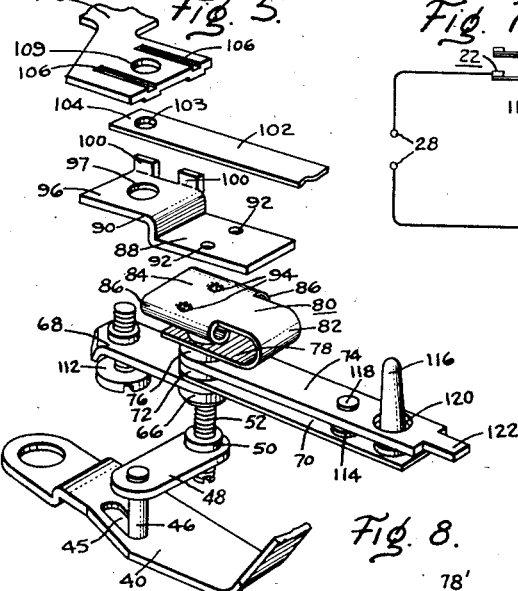
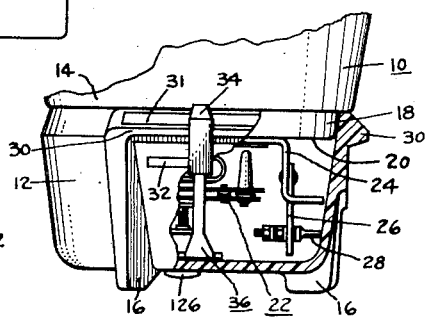
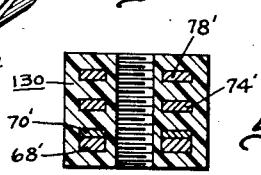
Inventor:
Frank C. Miklas
by Armand Cifelli
His Attorney

United States Patent Office 2,806,107
Patented Sept. 10, 1957

2,806,107

ADJUSTABLE THERMOSTAT FOR COOKING APPLIANCE OR THE LIKE

Frank C. Miklas, Allentown, Pa., assignor to General Electric Company, a corporation of New York Application December 1, 1955, Serial No. 550,342

11 Claims. (Cl. 200—138)

This invention relates to heat responsive control devices and particularly to an improved thermostat.

The thermostat art is a highly developed one, and yet it constantly strives for inexpensive, reliable constructions which are capable of long use. The cost of thermostats is in large part due to the number of components which must be assembled and the cost of labor in accomplishing such assembly. Reliability of the thermostat is influenced by the accuracy of the thermostat and the ease with which it may be maintained in properly calibrated condition. The effective life of a thermostat depends largely upon the life of the contacts which form a part of it. A factor which adversely influences the life of thermostat contacts is that of unequal pressure between the contacts which usually attends different settings of adjustable thermostats.

It is an object of this invention to provide an improved thermostat which is inexpensive to manufacture, reliable in use, and which has a long life.

The object of my invention is accomplished in one form by providing a thermostat having a stacking which lends itself to easy manufacture, calibration means which may be readily utilized, and a switch blade assembly wherein the contacts are subjected to uniform pressure over the full operating range of the thermostat regardless of the temperature setting selected.

Other objects and further details of that which I believe to be novel and my invention will be clear from the following description and claims taken with the accompanying drawing wherein:

Fig. 1 is a fragmentary elevation view with portions shown in section of the improved thermostat and supporting structure therefor showing the parts of the thermostat in a representative setting and in cold condition, that is, with the thermostat contacts engaging.

Fig. 2 is a view similar to Fig. 1, but with the thermostat adjusted for operation at a different temperature setting.

Fig. 3 is a view similar to Fig. 2, but showing the parts in hot condition, that is, with the thermostat contacts forced out of engagement.

Fig. 4 is a sectional view taken substantially on line 4—4 of Fig. 1.

Fig. 5 is an exploded view showing the major components of the improved thermostat.

Fig. 6 is a fragmentary elevation view with portions cut away and shown in section for the purpose of clarity of the lower portion of an appliance having the improved thermostat incorporated therein.

Fig. 7 is a wiring diagram showing a circuit in which the improved thermostat may be incorporated.

Fig. 8 is a central sectional view of a modified switch stacking.

The improved thermostat is illustrated as being incorporated in a heating appliance, such as a coffee maker, in Fig. 6. The thermostat may be utilized in various other heating appliances, and will be disclosed in a coffee maker primarily for purposes of exemplification. Whereas it may be used in numerous other heating appliances, it is well-suited for use in a coffee maker in that it readily lends itself for use as a brew control. The thermostat is adjustable and affords pre-selection by the user of the appliance of the temperature at which the thermostat contacts will disengage. In the case of a heating appliance, the thermostat may be used to control heating by opening the circuit which includes it and a heating means at the desired temperature; a circuit of this type is shown in Fig. 7.

In Fig. 6 the coffee maker is illustrated generally by reference numeral 10; it comprises a base 12, a body 14, heating means (not shown) for heating the material in the body, and internal coffee maker structure (not shown) for brewing the coffee; other conventional elements of the coffee maker, such as the cover and spout are not shown. None of the omitted components form a specific part of my invention, the latter being directed to the improved thermostat.

As illustrated in Fig. 6, the base 12 includes a plurality of legs 16 for supporting the coffee maker on a surface. The base 12 may be molded of a suitable electrical and heat insulating material, such as any of the available plastic materials that are suited for the purpose. The base 12 is connected to the body 14 by seating on the projecting portion 18 of the body which is of reduced diameter; the connection may be a friction fit or any other desirable one, and particularly may be a detachable one. Projecting portion 18 terminates in a substantially flat wall 20 which comprises the bottom of the coffee maker body. The bottom 20 should be made of a material of good heat conductivity in order to transmit heat from the interior of the body to the interior of the base. The improved thermostat is indicated in Fig. 6 generally by the reference numeral 22, and it will there be seen that substantially all of its components are mounted within the base 12; generally horizontally disposed support bracket 24 may support all of the thermostat components and is rigidly secured to the bottom 20 in any conventional manner. Support bracket 24 also may support depending plate 26 of suitable insulating material which in turn supports a pair of conventional, electrical terminal prongs 28 which are adapted to have an end of a conventional cord set connected to them for the purpose of supplying electricity to the heating means of the appliance. Support bracket 24 has a tab portion 108 which is most intimately associated with the thermostat (see Fig. 5), as will become apparent subsequently.

Base 12 has a horizontally extending flange 30 formed on one of its sides near its top, which supports a suitable escutcheon 31 having informative indicia relating to the various temperature (brew) settings which may be selected. Horizontally extending slot 32 is formed in base 12 below and adjacent to flange 30 and escutcheon 31. Control knob 34, which may be manually moved by the user in a generally horizontally direction to select a temperature setting, is connected to the upper projecting portion 38 of thermostat adjusting lever 36. The lever 36 is disposed substantially within the base 12, but has a bent upper portion 38 which extends through the slot 32 to the exterior of the base, where the knob 34 is connected.

By reference to Fig. 3, it will be observed that the lever 36 comprises an elongated strip having a horizontal portion 40 which is pivoted at one of its ends to an upstanding support 42 and retained thereon by spring grip washer 44 or the like. The other end of the horizontal portion 40 is connected to an upwardly inclined portion 43 of the lever, which is bent at its upper end into the referred-to upper projecting portion 38. In Fig. 5 it will be observed that the horizontal portion 40 has a slot 45 formed therein in which detachably receives a downwardly extending pin 46 which is secured at its upper end rigidly to the link 48, which forms a part of the thermostat adjusting and calibrating mechanism. It should be noted that the base 12 carries the lever 36 with it, and that the base may be removed from the body 14; when this is done, the lever remains with the base by virtue of the detachable connection between the pin 46 and the slot 45. When the base is initially assembled or removed and reassembled onto the body, it is necessary to position the pin 46 in the slot 45.

The link 48 at its end which is opposite to the end which carries the pin 46 has a formed opening 50 which is internally threaded and adapted to be mounted on the threaded control screw 52 (see Figs. 4 and 5). The link 48 is rotatable relative to the control screw 52, but may be retained in a fixed position by the locknut 54. Control screw 52 supports a stacking 56 thereon. Stacking 56, one form of which is illustrated in Fig. 4, comprises the bushing 58 which is internally threaded and adapted to be adjustably mounted for axial movement on the control screw 52, and a plurality of components (including switch elements) which are supported thereon. At its lowermost end, the bushing 58 is illustrated in Fig. 4 as being rolled over at 60 so as to tightly engage the washer 62 and retain all of the components mounted on the bushing rigidly in a non-shifting relationship between the rolled over end and the flange 64 which is formed on the other (uppermost) end of the bushing. Adjacent and above the washer 62 there is sequentially supported an electrical insulating ring 66, a terminal bar 68, a first switch blade 70, which is arbitrarily designated as the lower switch blade for purpose of convenience, electrical insulating ring 72, a second or upper switch blade 74, electrical insulating ring 76, and the lower leg 78 of a U-shaped spring clip 80. Note how the insulating rings 66, 72 and 76 are formed and cooperate to insulate the terminal bar and switch blades from the remainder of the stacking.

Spring clip 80, in addition to the leg 78, comprises the bight portion 82 and the upper leg 84 (see Figs. 4 and 5). Leg 84 has curled side portions 86 which assist in mounting the spring clip 80 onto the tab 88 of the control bracket 90. The tab 88 has a pair of openings 92 formed therein which are located so as to overlie the downwardly projecting detents 94 which are formed in the leg 84 of the spring clip 80 when the parts are assembled (see Fig. 5). To mount the spring clip 80 onto the control bracket 90, it is simply necessary to push the leg 84 onto the tab 88. The curled side portions 86 are flexible and permit the tab portion 88 to move relative to the spring clip 80 until the detents 94 enter the openings 92 and thereby locate the spring clip 80 rigidly but detachably on the control bracket 90.

Control bracket 90 has in addition to the tab 88, an offset, flat mounting portion 96 which is apertured at 97 and adapted to be received on the stud 98 which depends from the bottom 20 (see Fig. 1). Located adjacent to the mounting portion 96 on the stud 98 is the mounting portion 104 of an elongated bimetal member 102. The mounting portion 104 of the bimetal member is apertured at 103 and adapted to thereby be positioned on the stud 98, and is angularly located between the coined ribs 106 formed on the previously mentioned tab portion 108 of the support bracket 24. The tab portion 108 may also be apertured at 109 and positioned about the stud 98, and it, the bimetal 102, and control bracket 90 be retained on the stud 98 in stacked relationship by the nut 110 (see Fig. 1). A pair of upwardly extending tabs 100 are disposed on one side of the mounting portion 96. Tabs 100 contact a side edge of the portion 108 and thereby render the control bracket non-rotatable relative to the tab portion.

It will thus be seen that the stud 98, which is rigidly secured to the bottom 20 in good thermal conducting contact therewith as by welding or the like, supports the tab portion 108 of the support bracket 24, the horizontally extending bimetal 102 and the control bracket 90.

Alternatively, the tab portion 108 may carry the stud 98, instead of the reverse, as by having the stud welded to the tab portion, which is part of the support bracket 24, which is rigidly secured to bottom 20. In this case, the tab portion supports all of the thermostat components.

By virtue of its detachable connection to upper leg 84 of the spring clip 80, the control bracket 90 supports the spring clip, which in turn is rigidly secured to the stacking 56, by its lower leg 78. The stacking 56 is adjustably mounted on the control screw 52 for axial movement relative thereto. The lower end of the control screw 52 adjustably carries the link 48, which supports the pin 46, which in turn is received in the slot 45 of the lever 36. It should be observed in Fig. 4 that the upper end 53 of the control screw is rounded, smooth and in bearing contact with the lower surface 89 of the tab 88, and that the opposite end of the control screw has a kerf 55 formed therein which may receive an implement, such as a screw driver, for the purpose of rotating the control screw, when calibrating the thermostat.

When the control screw 52 is rotated, the bushing 58, hence the entire stacking 56, moves axially along the control screw. The stacking 56 does not rotate with the control screw, because it is rigidly connected to the spring clip 80, which is not movable angularly relative to the control screw in a plane normal to the major axis of the control screw, because of its rigid connection to the control bracket 90, and since movement of the latter is prevented by the tabs 100 on mounting portion 96 which contact a side edge of the tab portion 108 of the support bracket 24 and thereby prevent any relative rotation between the control bracket and support bracket as was previously mentioned. Whereas relative movement between the bushing 58 and the control screw 52 does not result in angular displacement of the stacking 56, it results in movement of the spring clip legs 78 and 84 either toward or away from each other. This obtains because the spring clip 80 is made of springy material and normally has its legs stressed toward a spread apart position when it is assembled in the thermostat whereas they lie relatively close to each other when unassembled. Movement of legs 78 and 84 results in adjustment of the thermostat, for the reason that it swings the entire stacking 56 relative to the support bracket 24 and bimetal 102, and thereby alters the distance between the bimetal and the switch blades. During such swinging, the upper end 53 of the control screw slides somewhat on the lower surface 89 of the tab 88, hence the movement is not pivoting for the point of pivoting moves. Fig. 1 shows a representative setting, and Fig. 2 shows an adjusted setting wherein the difference in the relevant distance may be seen. Alteration of this distance results in adjustment of the temperature at which the thermostat opens the circuit of which it is a part, because it varies the amount the bimetal 102 must deflect to separate the contacts.

Rotation of the control screw 52 normally occurs as a result of pivoting of the link 48, which results from pivoting the lever 36. Horizontal movement of the knob 34 causes the lever 36 to pivot about upstanding support 42, and by virtue of the pin 46 and slot 45 connection, the link 48 is pivoted. The link 48 when pivoted, normally rotates the control screw 52, rather than merely slide axially thereon, because of its rigid connection to the control screw effected by the locknut 54.

Reference to Figs. 1 through 3 and 5 will facilitate an understanding of the components and assembly of the stacking. The terminal bar 68 extends from the bushing 58 in one direction and carries an adjustable screw 112 at its free end for the purpose of allowing an electrical conductor to be connected thereto in a conventional manner. Lower switch blade 70 extends away from the bushing 58 in an opposite direction to that of the terminal bar 68, and carries an electrical contact 114 near its free end. Substantially at its free end, the lower switch blade carries a projecting actuator 116, which is made of an electrical insulating material. Adjacent portions of the terminal bar 68 and lower switch blade 70 are in electrical contact, and each of these members is an electrical current carrying member. The upper switch blade 74 is spaced from the lower switch blade 70 by the electrical insulating ring 72, and extends from the bushing 58 in substantially the same direction as the lower switch blade, but it is spaced therefrom and generally parallel thereto. The upper switch blade 74 carries an electrical contact 118 which is located so as to oppose the contact 114. At its free end, the upper switch blade has an opening 120 through which the actuator 116 extends. The upper switch blade 74 is a current carrying member and is made of material which is thicker than the lower switch blade and, therefore, is relatively rigid as compared with the lower switch blade, which is relatively springy. The upper switch blade has an extension 122 formed thereon, to which an electrical conductor may be secured, as by welding.

While the improved thermostat may be employed in many different environments, for the purpose of understanding the instant invention, it is only necessary to consider the thermostat 22, which has been described in detail, as being interposed in an electrical circuit which includes a source of electricity and an electrical heating means, such as an electrical resistance H (see Fig. 7). When the thermostat contacts 114 and 118 are in engagement, current flows from a source through one of the conventional terminal prongs 28 through the contacts 114 and 118 (which are shown as in engagement in Fig. 7), the heating means H, and through the other conventional terminal prong 28. When a predetermined, preselected temperature is reached, the circuit will be opened by virtue of a parting of the contacts. The thermostat 22 effects such parting and also affords selectivity as regards the temperature at which the contacts will be parted. This is accomplished by the bimetal member 102 and the manner in which it cooperates with the switch blades, and particularly the actuator 116.

In Fig. 1 the thermostat is illustrated in a representative setting in cold condition. The term "cold condition" means prior to heating the material in the body 14 and when the contacts are in engagement. It will be observed in Fig. 1 that the bimetal member 102 extends generally above the switch blades and has a portion which is disposed above the actuator 116 and spaced therefrom. As was previously mentioned, the distance between the actuator 116 and the bimetal member 102 determines the temperature at which the circuit will be broken. This obtains for the reason that the bimetal 102 has its high expansion side facing upwardly, and that upon connecting the conventional terminal prongs 28 to a source of electricity, current flows through the heating means H, which is not shown as it physically exists in a heating appliance, but which may be disposed in any conventional manner in such an appliance to heat the material within the body 14. If the appliance is a coffee maker of the precolating variety, the heating means H may be disposed to heat the liquid in a pump chamber to percolate the liquid. Regardless of the type of appliance involved, heating of the material in the body 14 results in an elevation of its temperature and thereby causes heat to be transmitted through the bottom 20, and the stud 98 to the bimetal member 102. By its inherent nature, and the manner in which it is mounted, upon heating up, the free end of the bimetal member deflects downwardly and ultimately contacts the actuator 116. Prior to such contact, the contacts 114 and 118 are in engagement by virtue of the manner of assembling the switch blades 70 and 74, for when the switch blades are assembled, and under normal conditions of non-use, the contacts are forced into engagement. The deflecting end of the bimetal member 102 after contacting the actuator 116 and upon further movement, forces the lower switch blade 70 away from the upper switch blade 74 and thereby separates the contacts. This is an open circuit condition which is shown mechanically in Fig. 3.

In order to vary the temperature at which the circuit is opened, the control knob 34 may be adjusted to vary the distance between the actuator 116 and the bimetal member 102 in the manner previously described in detail. It naturally follows that if this distance is increased, it will require more deflection on the part of the free end of the bimetal member 102 before contact separation is effected, hence, a higher temperature before the circuit is broken.

Fig. 2 illustrates the parts in an adjusted position in cold condition. It will be observed by comparing Figs. 1 and 2 that in the position of the adjustment illustrated in Fig. 2, the actuator 116 is virtually in contact with the bimetal member 102 at the outset. Therefore, the contacts will part at a lower temperature than that at which they will part when the thermostat is in the Fig. 1 setting.

Fig. 3 shows the thermostat when adjusted to the Fig. 2 position, in hot condition, i. e., after the bimetal has deflected to separate the contacts.

From the foregoing, it should be apparent that the thermostat has been provided which affords selectivity on the part of the user as regards the temperature at which a circuit is broken. This may be utilized to terminate a heating period, as when the thermostat is incorporated in a heating appliance, or it may be used for other purposes wherever it is desired to open a circuit at a predetermined temperature. It should be further observed that by virtue of the arrangement described, the thermostat may be adjusted from the exterior of the appliance by a horizontal sliding motion of a control knob 34, which is transmitted through the linkage described to reduce or increase the distance between the bimetal member 102 and the actuator 116. This is particularly useful in the coffee maker application described for the reason that it permits control of the thermostat by motion in the horizontal plane which blends well in with the styling of the coffee maker.

A particularly facile manner of initially assembling and calibrating the improved thermostat is as follows:

The bimetal 102 and control bracket 90 are fastened to the stud 98 by the nut 110. Complete switch stacking 56 with the link 48, control screw 52, and locknut 54 assembled thereto in approximately final position is assembled to the control bracket 90 by means of the curled portions 86 of the spring clip 80 which cooperate with tab 88 of the control bracket. A suitable gauge block is then interposed between the bimetal 102 and the actuator 116. The link 48 is held in a position corresponding to the maximum temperature setting and the screw 52 is then adjusted to achieve opening of the contacts. The locknut 54 is then tightened to lock the link on the screw. An advantage of this type of calibration method lies in the fact that compensation for possible variation in the contact pressure of different stackings is calibrated in.

It will be apparent that initial assembly and calibration will take place at the factory prior to mounting the base onto the body. In order to permit subsequent calibration without dismounting the base from the body, opening 124 is formed in the base at a point below the control screw 52. This opening is closed normally by a detachable plug button 126 having a head which covers the opening and suitable resilient prongs for engaging the walls which form the opening, to seat the plug button therein. It will be understood that the button may be removable at will when it is desired to have access to the control screw 52 and locknut 54 for calibrating the thermostat subsequent to attaching the base on the body. This arrangement enables the thermostat to be calibrated after leaving the factory without removing the base. Of course, the base may be removable for general access to the bottom of the body, if this is desired.

Fig. 8 illustrates a modified stacking 130 which may be substituted for the stacking 56 illustrated in Fig. 4. Stacking 130 comprises a molded assembly wherein each of the essential stacked elements of Fig. 4 is included and designated by its reference numeral with a prime added. Fig. 8 illustrates one of the advantages of the invention, in that it permits the stacking to be molded as a unitary assembly. When this is done, the essential elements 68', 70', 74' and 78' are appropriately positioned in a mold and the molding material molded about them. In the Fig. 8 stacking, the bushing 58 is eliminated, and the internal threads which cooperate with the control screw 52 may be formed in the molded material.

It should be apparent that the objects of this invention are satisfied by the improved thermostat. Regardless of the position of adjustment, the contacts are under uniform contact pressure; this enhances contact life and hence the life of the thermostat. The improved thermostat allows for calibration without substantial disassembly of the parts, in that it is solely necessary to remove the plug button 126 and then to calibrate the thermostat in the manner described (by adjusting link 48 relative to control screw 52). When proper calibration is made, the plug button is replaced in opening 124. While calibration is normally done at a factory, it may, if desired, be readily done by a repairman. Lastly, because of the nature of the thermostat construction, the stacking may be a molded one, thereby effecting a cost saving.

As will be evident from the foregoing description, certain aspects of my invention are not limited to the particular details of construction of the examples illustrated, and I contemplate that various and other modifications and applications will occur to those skilled in the art. It is, therefore, my intention that the appended claims shall cover such modification and applications as do not depart from the true spirit and scope of my invention.

What I claim as new and desire to secure by Letters Patent of the United States is:

1. A heat responsive control for an electrical circuit comprising a pair of contacts, a pair of switch blades each carrying one of said contacts, said contacts normally engaged but being separable, heat responsive means normally spaced from said blades but being deflectable to move one of said blades relative to the other to separate said contacts, and means for mounting said blades for joint swinging movement relative to said heat responsive means to vary the distance therebetween, said mounting means being adapted to jointly position said blades in any one of a plurality of positions relative to said heat responsive means to thereby vary the temperature at which the contacts are separated, said mounting means including rotary control means and being arranged to translate rotary motion of said last named means into swinging of said blades to move and position the latter relative to said heat responsive means.

2. A control as defined in claim 1 which includes a pivotally mounted lever that is operatively associated with said mounting means to provide said rotary motion upon being pivoted.

3. A control as defined in claim 2 wherein the control is mounted in a housing having a horizontal slot, said lever is pivoted in a generally horizontal plane and includes a portion that extends through said slot and is accessible from the exterior of said housing, whereby upon movement of said portion, the horizontal motion of said portion is translated through said lever and mounting means into swinging motion of said blades to move the latter relative to said heat responsive means to adjust the temperature at which the contacts are separated.

4. A control as defined in claim 1 wherein said mounting means comprises a support and a control member, said support and member each having cooperating threaded portions, said support carrying said blades and being restrained from rotating about said member, whereby upon rotation of said member the support and blades move axially relative to said member causing said blades to move relative to said heat responsive means.

5. A device as defined in claim 4 wherein said control member and support are carried by a U-shaped spring clip, said support being rigidly connected to one of the legs of said clip and said member having an end that exerts a force on the other of said legs to urge said legs apart, whereby upon rotation of said member, said support and said one leg are moved axially relative to said member, and said legs are either urged apart or closer to each other, resulting in swinging of said blades to move the latter either toward or away from said heat responsive means, depending upon the direction of rotation.

6. A control as defined in claim 1 wherein said mounting means comprises a stacking having a threaded bushing that is mounted on a control screw for axial movement thereon.

7. A control as defined in claim 1 wherein said mounting means comprises a stacking that includes portions of said blades, is molded of electrical insulating material and has a threaded opening that receives a control screw for adjustment thereof.

8. A heat responsive control for an electrical circuit comprising a bimetal strip secured at one end, a bracket rigidly mounted and supporting a U-shaped spring clip by one of the latter's legs, the other clip leg being rigidly connected to and supporting a switch blade stacking, said stacking comprising a pair of elongated spaced switch blades, each of which carries an electrical contact, said contacts lying adjacent to each other and normally being in engagement, said blades being disposed generally parallel to said strip, the free end of said strip adapted to deflect in response to an increase in temperature toward said blades to move one of said blades away from the other to separate the contacts, and adjusting means cooperating with said legs for moving the latter relative to each other and thereby moving said stacking relative to said strip, whereby movement of said stacking alters the distance between said blades and said strip and consequently changes the temperature at which said contacts will separate.

9. A control defined in claim 8 wherein said adjusting means comprises a threaded member that cooperates with a threaded opening in said stacking said member having an end that applies a force on said one leg of said clip, whereby rotation of said threaded member causes said legs to move relative to each other, said stacking to move axially relative to said threaded member and said end to move relative to said one leg, the combined effect of the latter movement being to swing the switch blades toward or away from said strip, depending upon the direction of rotation, to thereby vary the distance between said strip and said switch blades.

10. A control as defined in claim 9 wherein said threaded member carries a link which in turn carries a projecting pin, and wherein a pivoted lever is provided which has a slot that receives said pin, whereby pivoting motion of said lever is transmitted through the pin and slot connection into rotation of said threaded member.

11. A control as defined in claim 10 wherein said link is adjustably mounted on said threaded member and means is provided to lock said link in adjusted position.

References Cited in the file of this patent

UNITED STATES PATENTS

| | | |
|---|---|---|
| 1,634,431 | Myers | July 5, 1927 |
| 2,008,163 | Walder | July 16, 1935 |
| 2,518,503 | Sparklin | Aug. 15, 1950 |
| 2,622,171 | Hiltenbrand | Dec. 16, 1952 |